(12) United States Patent
Chun et al.

(10) Patent No.: US 10,416,719 B2
(45) Date of Patent: Sep. 17, 2019

(54) FOLDABLE DISPLAY DEVICE AND METHOD FOR CONTROLLING SAME

(71) Applicant: LG ELECTRONICS INC., Seoul (KR)

(72) Inventors: Sinae Chun, Seoul (KR); Doyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/517,400

(22) PCT Filed: Oct. 24, 2014

(86) PCT No.: PCT/KR2014/010051
§ 371 (c)(1),
(2) Date: Apr. 6, 2017

(87) PCT Pub. No.: WO2016/064008
PCT Pub. Date: Apr. 28, 2016

(65) Prior Publication Data
US 2017/0308125 A1 Oct. 26, 2017

(51) Int. Cl.
*G09G 5/00* (2006.01)
*G06F 1/16* (2006.01)
*G06F 3/01* (2006.01)
*G06F 3/147* (2006.01)
(Continued)

(52) U.S. Cl.
CPC .............. *G06F 1/1641* (2013.01); *G06F 1/16* (2013.01); *G06F 3/01* (2013.01); *G06F 3/147* (2013.01);
(Continued)

(58) Field of Classification Search
CPC ...... G06F 3/1423; G06F 3/147; G06F 3/1446; G06F 1/16; G06F 3/01; G06F 1/1641;
(Continued)

(56) References Cited

U.S. PATENT DOCUMENTS

| 7,633,744 B2* | 12/2009 | Kuhn | G06F 1/1616 248/919 |
| 8,866,840 B2* | 10/2014 | Dahl | G06F 1/1616 345/1.3 |

(Continued)

FOREIGN PATENT DOCUMENTS

| KR | 10-2010-0030114 A | 3/2010 |
| KR | 10-2010-0082451 A | 7/2010 |

(Continued)

*Primary Examiner* — Vijay Shankar
(74) *Attorney, Agent, or Firm* — Birch, Stewart, Kolasch & Birch, LLP

(57) ABSTRACT

Disclosed in the present specification are a foldable display device for displaying interconnected first and second contents respectively in a first display region and a second display region which are physically and visually separated by the folding of a housing part, and a method for controlling the same. The foldable display device according to the present invention is capable of further displaying a second content connected with a first content in a second display region facing the same direction as a first display region when the housing part is converted from a completely folded state to a half unfolded state during a period of displaying the first content in the first display region of at least two display regions which are physically or visually separated by the folding of the housing part in a state where the housing part is completely folded. The present specification allows a user to simultaneously identify the first content displayed in the first display region and the second content displayed in the second display region in the second state. Accordingly, the user can conveniently simultaneously compare at least two interconnected contents.

18 Claims, 12 Drawing Sheets

(51) Int. Cl.
*G06F 3/14* (2006.01)
*G09G 5/14* (2006.01)

(52) U.S. Cl.
CPC .......... *G06F 3/1446* (2013.01); *G09G 5/006* (2013.01); *G09G 5/14* (2013.01); *G06F 3/1423* (2013.01); *G09G 2330/02* (2013.01); *G09G 2360/04* (2013.01); *G09G 2380/02* (2013.01)

(58) Field of Classification Search
CPC .. G09G 2360/04; G09G 2380/02; G09G 5/14; G09G 2330/02
See application file for complete search history.

(56) References Cited

U.S. PATENT DOCUMENTS

| | | | | |
|---|---|---|---|---|
| 9,052,769 B2* | 6/2015 | Choi | ............... | G06F 3/0414 |
| 9,684,342 B2* | 6/2017 | Kim | ............... | G06F 1/1616 |
| 2010/0201604 A1* | 8/2010 | Kee | ............... | G06F 1/1616 |
| | | | | 345/1.3 |
| 2011/0216064 A1* | 9/2011 | Dahl | ............... | G06F 1/1616 |
| | | | | 345/428 |
| 2015/0185968 A1* | 7/2015 | Kim | ............... | G06F 3/0484 |
| | | | | 715/788 |

FOREIGN PATENT DOCUMENTS

| | | |
|---|---|---|
| KR | 10-2010-0092222 A | 8/2010 |
| KR | 10-2011-0053269 A | 5/2011 |
| KR | 10-2011-0082359 A | 7/2011 |

\* cited by examiner

FIG. 3A
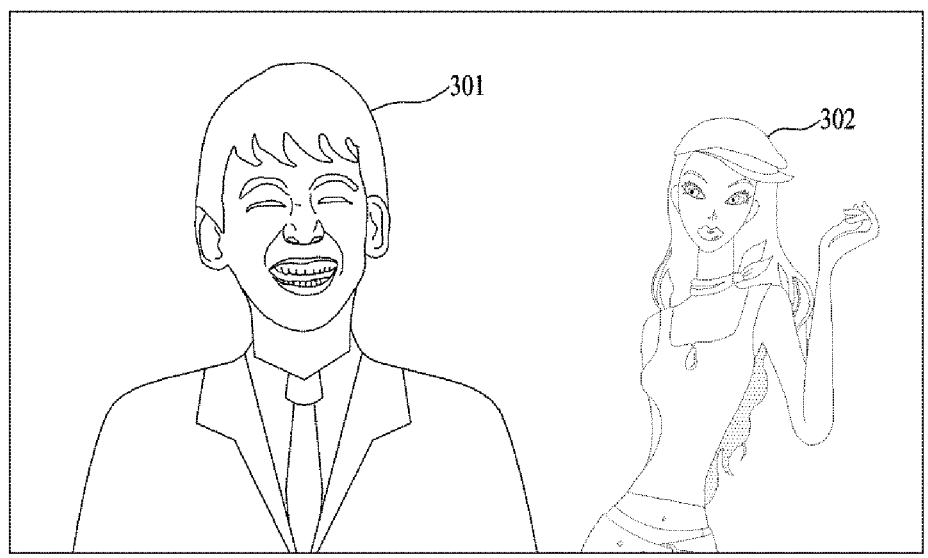
(a)
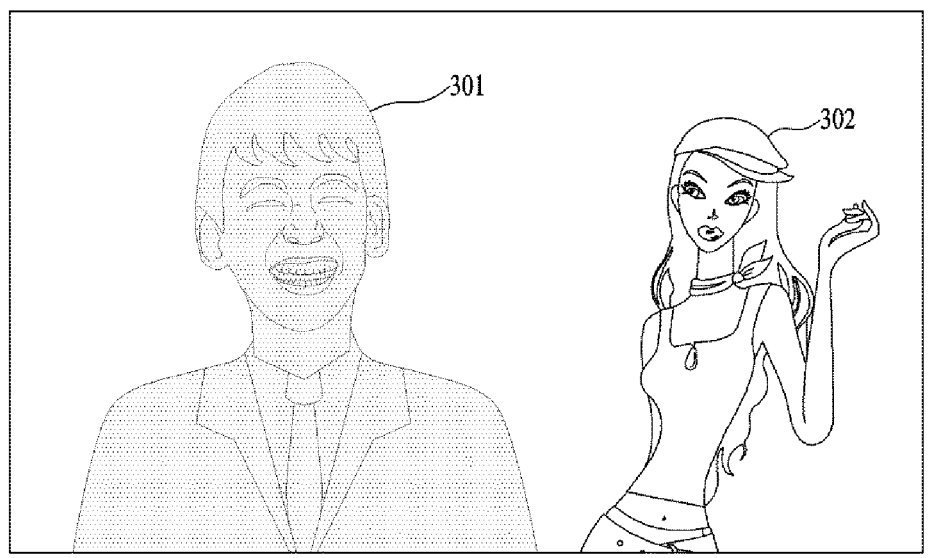
(b)

FIG. 3D
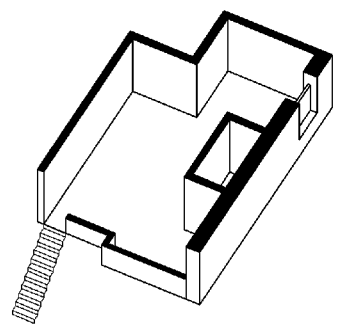
(a)
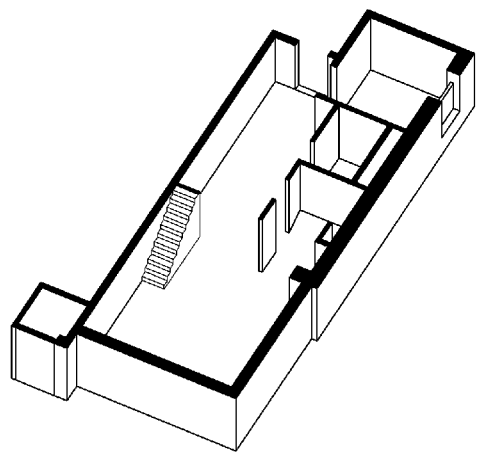
(b)

FIG. 3E
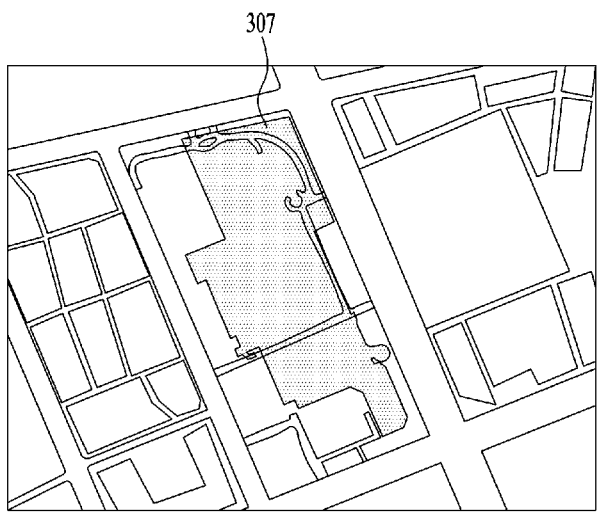
(a)
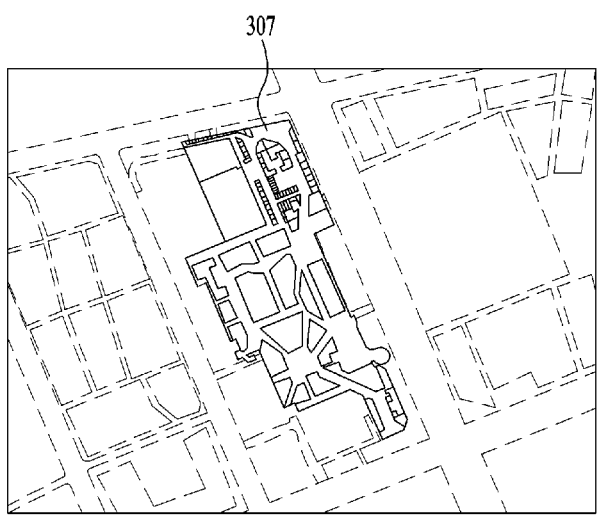
(b)

| Korean Document | There is a maxim which exists in various forms in many countries: "He who in not a radical at 20 does not have a heart; he who still is one at 40 does not have a head." This statement is usually interpreted as a conservative one, assuming radicalism is an unintelligent response to politics. |

(a)          (b)

FOLDABLE DISPLAY DEVICE AND METHOD FOR CONTROLLING SAME

CROSS REFERENCE TO RELATED APPLICATIONS

This application is the National Phase of PCT International Application No. PCT/KR2014/010051, filed on Oct. 24, 2014, which is hereby expressly incorporated by reference into the present application.

TECHNICAL FIELD

The present specification relates to a foldable display device and a method of controlling therefor.

BACKGROUND ART

Recently, various types of display devices are developing in accordance with the development of technologies. In particular, in order to satisfy the needs of a user intending to watch an image with a bigger screen while enhancing portability, study on a foldable display device of which a plurality of displays are located at a foldable housing is in active progress.

A user may use a foldable display device in a folded state to watch a single display only or may use the foldable device in an unfolded state to watch a plurality of displays at a time depending on a necessity.

Meanwhile, in case of 3 foldable display device, 2 display units are shown to a user with a different height in a state that the 2 display units are separated from each other in a medium unfolded state. Hence, it is necessary to have a technology applied to the medium unfolded state.

DISCLOSURE OF THE INVENTION

Technical Task

The present specification is designed based on the aforementioned related art. An object of the present specification is to provide a foldable display device and a method of controlling therefor.

Technical Solution

To achieve these and other advantages and in accordance with the purpose of the present invention, as embodied and broadly described, according to one embodiment, a foldable display device includes a housing unit configured to include at least 3 or more bases, at least two or more hinge units configured to physically connect the bases in a manner of being positioned between the bases and make the bases have a completely unfolded state that the bases are located at the same plane, a completely folded state that the bases are layered, and an intermediate unfolded (or an intermediate folded) state corresponding to a connection state between the completely unfolded state and the completely folded state, a display unit configured to be positioned at least one side of the housing unit, a folding sensor unit configured to output a signal (hereinafter, state signal) for the completely folded state, the intermediate unfolded (or intermediate folded) state, or the completely unfolded state of the housing unit, and a controller configured to detect a state of the housing unit by receiving the state signal from the folding sensor unit and control the display unit. In this case, when first content is displayed in a first display region among at least two or more display regions which are physically or visually separated by the folding of the housing unit in the completely folded state of the housing unit (hereinafter, first state), if the completely folded state of the housing unit is switched to the intermediate unfolded state of the housing unit, the controller can further display second content interconnected with the first content in a second display region facing a direction identical to a direction at which the first display region is facing (hereinafter, second state).

The controller can further display information indicating the existence of the second content interconnected with the first content in the first display region in the first state.

According to one embodiment of the present specification, the controller can display content identical to the first content, which is displayed in the first display region in the first state, in the first display region in the second state.

According to a different embodiment of the present specification, the controller can display content of which the second content is excluded from the first content, which is displayed in the first display region in the first state, in the first display region in the second state.

The second content may corresponds to a plurality of second contents. In this case, the controller can display one of a plurality of the second contents in the second display region according to the extent of the second state approaching to the completely unfolded state (or the completely folded state).

As an example, a plurality of the second contents can include a value (hereinafter, difference value) indicating the extent of a difference of a plurality of the second contents interconnected with the first content. In this case, the controller can display second content of which the difference value is big among a plurality of the second contents in the second display region as the second state is getting close to the completely unfolded state.

The foldable display device according to the present specification can further include a touch sensor unit configured to detect a user touch touched on the display unit and output an input signal. In this case, the controller can receive the input signal, analyze a user input, and control a screen displayed on the display unit according to the analyzed input.

According to one embodiment of the present specification, if a user input inputted on the first display region in the second state corresponds to an input for magnifying a screen, the controller can control a screen of the first content displayed in the first display region to be magnified only.

According to a different embodiment of the present specification, if a user input inputted on the first display region in the second state corresponds to an input for magnifying a screen, the controller can control screens of the first content and the second content displayed in the first display region and the second display region to be magnified with the same ratio.

According to one embodiment of the present specification, if a user input inputted on the first display region in the second state corresponds to an input for moving a screen, the controller can control a screen of the first content displayed in the first display region to be moved only.

According to a different embodiment of the present specification, if a user input inputted on the first display region in the second state corresponds to an input for moving a screen, the controller can control screens of the first content and the second content displayed in the first display region and the second display region to be moved with the same distance in the same direction.

According to one embodiment of the present specification, the first content and the second content may correspond to images having a different focus on the same target.

According to a different embodiment of the present specification, the first content and the second content may correspond to images having different time information on the same target.

According to a further different embodiment of the present specification, the first content and the second content may correspond to floor plans having a different height for the same building.

According to a further different embodiment of the present specification, the first content and the second content may correspond to maps having a different height for the same region.

According to a further different embodiment of the present specification, the first content and the second content may correspond to maps represented by a different scheme for the same region.

According to a further different embodiment of the present specification, the first content and the second content may correspond to documents written by a different language for the same content.

According to a further different embodiment of the present specification, the first content and the second content may respectively correspond to an original version and a revised version for the same document.

If the display unit is switched to the completely unfolded state from the second state, the controller can display the first content on the display unit.

To further achieve these and other advantages and in accordance with the purpose of the present invention, according to a different embodiment, a method of controlling a foldable display device, which includes a housing unit configured to include at least 3 or more bases, at least two or more hinge units configured to physically connect the bases in a manner of being positioned between the bases and make the bases have a completely unfolded state that the bases are located at the same plane, a completely folded state that the bases are layered, and an intermediate unfolded (or an intermediate folded) state corresponding to a connection state between the completely unfolded state and the completely folded state, and a display unit configured to be positioned at least one side of the housing unit, includes the steps of displaying first content in a first display region among at least two or more display regions which are physically or visually separated by the folding of the display unit in the completely folded state of the housing unit, detecting a state of the housing unit by receiving a state signal from a folding sensor unit configured to output a signal for the completely folded state, the intermediate unfolded (or intermediate folded) state, or the completely unfolded state of the housing unit, and if the state of the housing unit is switched to the intermediate unfolded state, further displaying second content interconnected with the first content in a second display region facing a direction identical to a direction at which the first display region is facing.

Advantageous Effects

According to one embodiment of the present specification, a user is able to check first content displayed in a first display region and second content displayed in a second display region at a time in a second state. Hence, the user can conveniently compare at least two or more interconnected contents at the same time.

According to a different embodiment of the present specification, an input for displaying the two or more interconnected contents in a different display region can be inputted by an intuitive operation of a user.

According to a further different embodiment of the present specification, when a distance between a first display region and a second display region changes, it is able to display second content having a value different from a value of first content in a second display region. By doing so, it is able to make a user intuitively recognize and operate the content.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Reference will now be made in detail to the preferred embodiments of the present invention, examples of which are illustrated in the accompanying drawings. In this case, configurations and actions of embodiments disclosed in the present specification are explained by at least one or more embodiments. A technical idea of the present specification and a core configuration/action of the present specification are not restricted by the at least one or more embodiments.

A foldable display device 100 according to the present specification includes a housing unit 110, a hinge unit (not depicted), a display unit 120, and a controller 130. A shape of the foldable display device according to the present specification is explained in the following with reference to FIG. 1.

Figure 1:
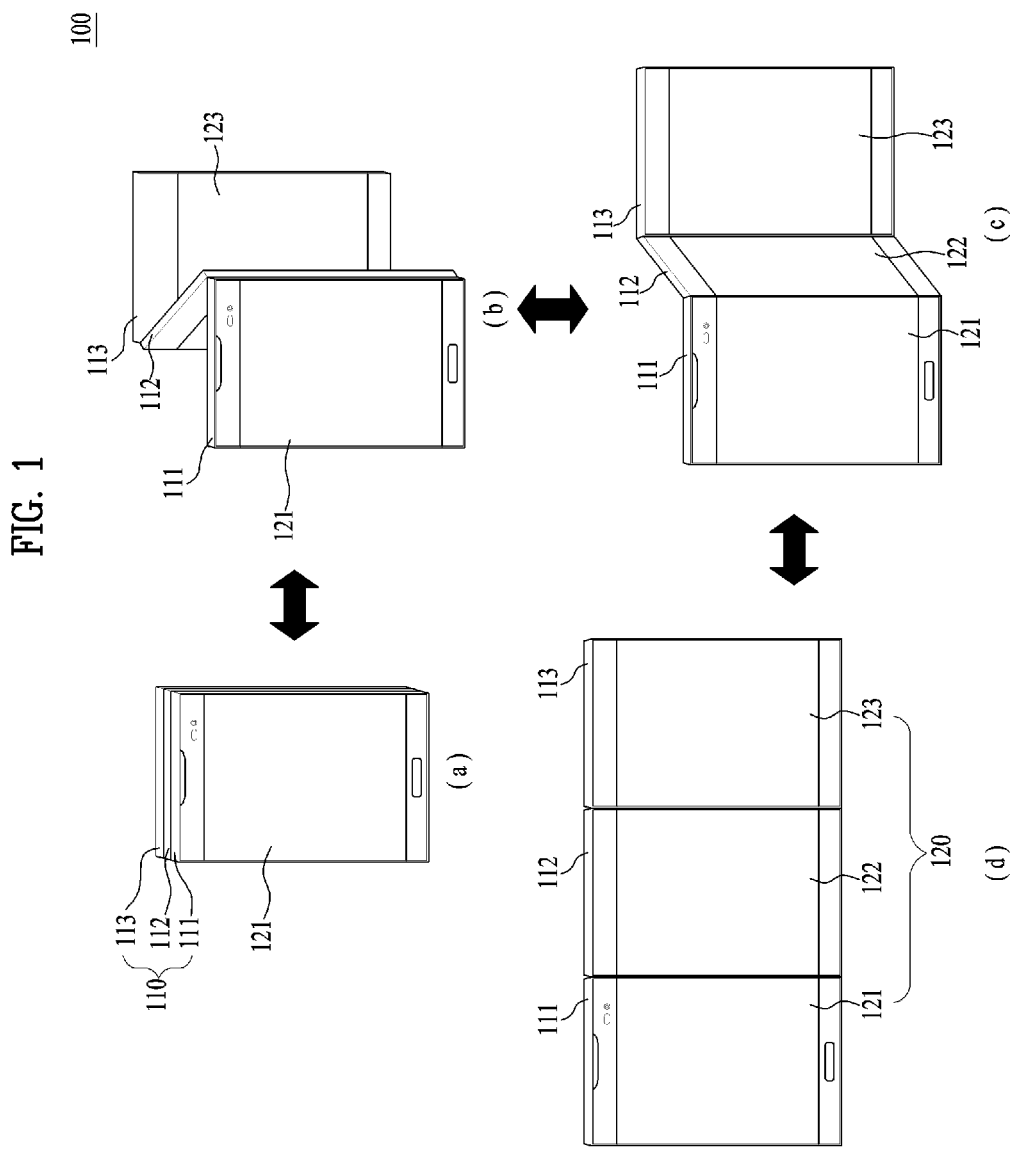
FIG. 1 is a diagram for an example of a foldable display device according to the present specification.

FIG. 1 is a diagram for an example of a foldable display device 100 according to the present specification.

Referring to FIG. 1, the housing unit 110 can include at least 3 or more bases. FIG. 1 shows the housing unit 110 consisting of 3 bases 111/112/113 in total as an example.

The hinge unit is located between bases and plays a role in physically connecting the bases. In this case, since there are at least 3 or more bases, there may exist at least 2 or more hinges.

The hinge unit has a mechanical structure to make two parts, which are connected with each other on the basis of a rotating axis, rotate on the basis of the rotating axis. Hence, the bases 111/112/113 connected with the hinge unit can also rotate on the basis of the rotating axis. As a result, the housing unit 110 may have various states. In FIG. 1, FIGS. 1(a) to 1(d) are sequentially shown to explain a folded state and an unfolded state of the foldable display device 100 according to the present specification. Various states capable of being possessed by the foldable display device 100 by combining the housing unit 110 and the hinge unit are described in the present specification. As shown in FIG. 1 (a), a state that the bases 111/112/113 are folded and layered is referred to as 'a completely folded state' of the housing unit 110. As shown in FIG. 1 (d), a state that the bases 111/112/113 are located at the same plane is referred to as 'a completely unfolded state' of the housing unit 110. And, as shown in FIG. 1 (b) or FIG. 1 (c), an intermediate state between the completely folded state and the completely unfolded state is referred to as 'an intermediate unfolded state (or an intermediate folded state)' of the housing unit 110.

The display unit 120 is located at least one side of the housing unit 110. Hence, the display unit 120 can be divided into at least two or more physically or visually separated regions due to the folding of the housing unit 110. The regions physically or visually separated due to the folding of the housing unit 110 are referred to as 'display region' in the present specification. In the example shown in FIG. 1, since the housing unit 110 has a shape consisting of 3 bases 111/112/113, the display unit 120 may have 3 display regions 121/122/123 according to the folding of the housing unit 110.

Meanwhile, in the completely folded state of the housing unit 110, one of display regions physically or visually separated by the folding of the housing unit 110 is referred to as a 'first display region' in the present specification. In the intermediate unfolded state of the housing unit 110, a display region facing a direction identical to a direction at which the first display region is facing is referred to as a 'second display region'. In the examples shown in FIGS. 1 (b) and (c), a reference number 121 and a reference number 123 correspond to the first display region and the second display region, respectively.

As shown in the embodiment of the drawing, the present specification is going to be described centering on a foldable display device 100 which is folded in such a shape as a letter 'Z'. However, the foldable display device according to the present specification is not restricted by the example shown in the drawing. In particular, A foldable display device may have such a shape as a letter 'S' that a display region 123 shown in the very right among the display regions is located at the top in the completely folded state of the housing unit 110. And, although the foldable display device including the housing unit 110 consisting of 3 bases is shown only in the present specification, a foldable display device consisting of 5 bases or 7 bases may also correspond to the foldable display device according to the present specification.

Figure 2:
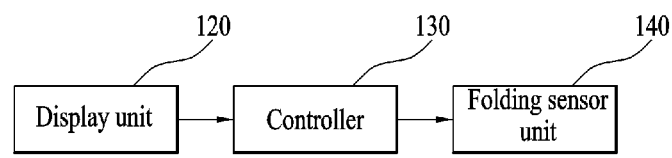
FIG. 2 is a block diagram for a simple electrical connection of a partial configuration included in a foldable display device according to the present specification.

FIG. 2 is a block diagram for a simple electrical connection of a partial configuration included in a foldable display device according to the present specification.

Referring to FIG. 2, it is able to check that the display unit 120, the controller 130, and a folding sensor unit 140 are connected with each other. A line connecting each of the configurations indicates that the configurations are electronically connected.

The folding sensor unit 140 can output a signal (hereinafter, a state signal) in response to the completely folded state, the intermediate unfolded state (or intermediate folded state), or the completely unfolded state of the housing unit 110. Moreover, when the housing unit 110 is in the intermediate unfolded state (or the intermediate folded state), the folding sensor unit 140 can output a state signal to indicate the extent of the intermediate unfolded state approaching to the completely unfolded state (or the extent of the intermediate unfolded state approaching to the completely folded state). In particular, the folding sensor unit 140 can output a state signal in response to a difference between FIG. 1 (b) and FIG. 1 (c). To this end, the folding sensor unit 140 senses the hinge unit to output the state signal.

The controller 130 receives the state signal from the folding sensor unit 140 and may be then able to detect a state of the housing unit 110. Hence, the controller 130 can detect a switching of the housing unit 110 switched from one state to another state. And, the controller 130 can control the display unit 120. When the housing unit 110 is in the completely folded state, the controller 130 can display first content in a first display region 121. In this case, if the housing unit 110 is switched to the intermediate unfolded state from the completely folded state, the controller 130 can further display second content interconnected with the first content in a second display region 123. The operation of the controller 130 is explained in more detail in the following.

First of all, the first content and the second content respectively displayed in the first display region 121 and the second display region 123 are explained.

The first content is interconnected with the second content. In the present invention, interconnection means that two or more contents different from each other are closely related with each other on the basis of a standard.

For clarity, it is explained with reference to FIG. 3 in the following.

FIG. 3 illustrates a first content and a second content according to the present specification.

According to a first embodiment of the present specification, the first content and the second content may correspond to images having a different focus on the same target.

Referring to FIGS. 3a (a) and (b), there are 2 images each of which includes same persons corresponding to a first person 301 and a second person 302. The image shown in FIG. 3a (a) corresponds to an image focused on the first person 301. The image shown in FIG. 3a (b) corresponds to an image focused on the second person 302. In FIG. 3a, a person, who is clearly displayed in the image by focusing on the person, is represented by a solid line. On the contrary, a person, who is blurredly displayed in the image due to the out of focus, is represented by hatching. Hence, in FIG. 3a (a), the first person 301 is represented by a solid line and the second person 302 is represented by hatching. In FIG. 3a (b), the first person 301 is represented by hatching and the second person 302 is represented by a solid line. Although each the images shown in FIGS. 3a (a) and (b) has a different focus, the images shown in FIGS. 3a (a) and (b) have such a commonality as the same target. Hence, the images are closely related with each other. As shown in FIGS. 3a (a) and (b), if images have a different focus on the same target, the images may become the first content and the second content.

Figure 3B:
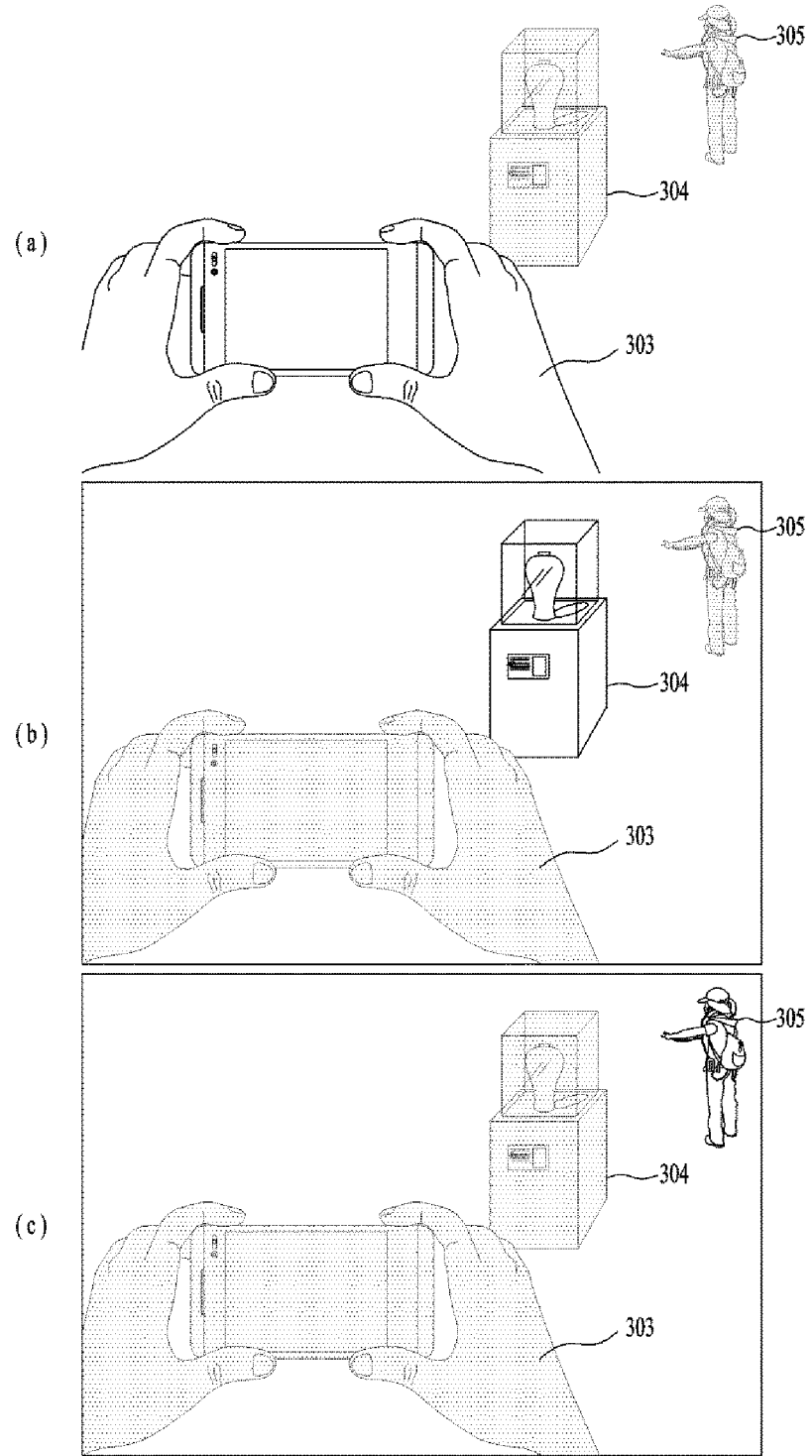
FIG. 3 illustrates a first content and a second content according to the present specification.

Meanwhile, it is not mandatory that first content and second content should be two contents in the present specification. In the present specification, such terms as 'first content' and 'second content' are used to distinguish one content from another content only. The terms do not set a limit on the number of contents. Referring to FIG. 3b, there are 3 images each of which includes a different focus. Referring to FIG. 3b (a), a focus is on a reference number 303. Referring to FIG. 3b (b), a focus is on a reference number 304. Referring to FIG. 3b (c), a focus is on a reference number 305. Similar to FIG. 3a, although each of the 3 images has a different focus, the images have such a commonality as the same target. Hence, the images are closely related with each other. The images shown in FIGS. 3b (a) and (b) may become the first content and the second content. And, the images shown in FIGS. 3b (b) and (c) may become the first content and the second content. And, the images shown in FIGS. 3b (c) and (a) may become the first content and the second content. Moreover, it may have such a relation as the image shown in FIG. 3b (a) corresponds to the first content and the images shown in FIGS. 3b (b) and (c) correspond to the second content. In particular, such a relation as 'first content and second content' can also be established from the 3 images.

According to the second embodiment of the present specification, the first content and the second content may correspond to images including different time information for the same target.

Figure 3C:
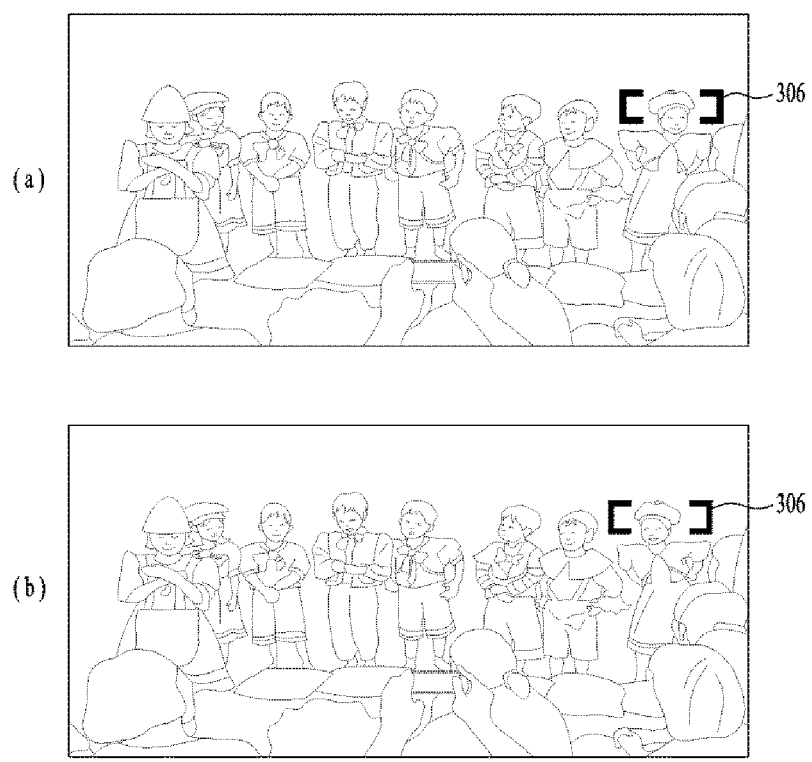

Referring to FIGS. 3c (a) and (b), there are two images that a shape of a person of a reference number 306 is changed only and the rest of persons are the same. The example shown in FIGS. 3c (a) and (b) randomly assumes a situation that two images are continuously captured with a very short time interval. Although the images shown in FIGS. 3C (a) and (b) have a difference in capturing timing, the images have such a commonality as the same target. Hence, the images are closely related with each other. Hence, as shown in FIGS. 3c (a) and (b), images including different time information for the same target may become the first content and the second content.

Meanwhile, it is able to check images including different time information for the same target through time information included in the images or information included in an image captured by a specific capturing mode such as a continuous capturing mode of a camera.

According to the third embodiment of the present specification, the first content and the second content may correspond to floor plans of a building having a different height for the same building.

Referring to FIGS. 3d (a) and (b), there are 3D floor plans of a building. The examples shown in FIGS. 3d (a) and (b) assume 3D floor plans for a multi-storied building. In this case, FIG. 3d (a) shows a 3D floor plan for an upper floor and FIG. 3d (b) shows a 3D floor plan for a lower floor. Although the floor plans shown in FIGS. 3d (a) and (b) have a difference in height, the floor plans have such a commonality as the same building. Hence, the floor plans are closely related with each other. Hence, as shown in FIGS. 3d (a) and (b), floor plans including different height for the same building may become the first content and the second content.

According to the fourth embodiment of the present specification, the first content and the second content may correspond to maps having a different height for the same region.

Referring to FIG. 3e, there are two images (a) and (b) for the same region. FIG. 3e (a) corresponds to a map at which a general road and a building location are displayed. In this case, it may assume that a part (reference number 307) represented by hatching in FIG. 3e (a) corresponds to a region at which underground stores are formed. Although the maps shown in FIGS. 3e (a) and (b) have a difference in height, the maps have such a commonality as the same region. Hence, the maps are closely related with each other. Hence, as shown in FIGS. 3e (a) and (b), maps including a different height for the same region may become the first content and the second content.

According to the fifth embodiment of the present specification, the first content and the second content may correspond to maps represented by a different scheme for the same region. As an example, the first content and the second content may correspond to a general map represented by signs and a picture map represented by a satellite picture, respectively.

According to the sixth embodiment of the present specification, the first content and the second content may correspond to documents written by a different language for the same contents.

Figures 3F, 4:
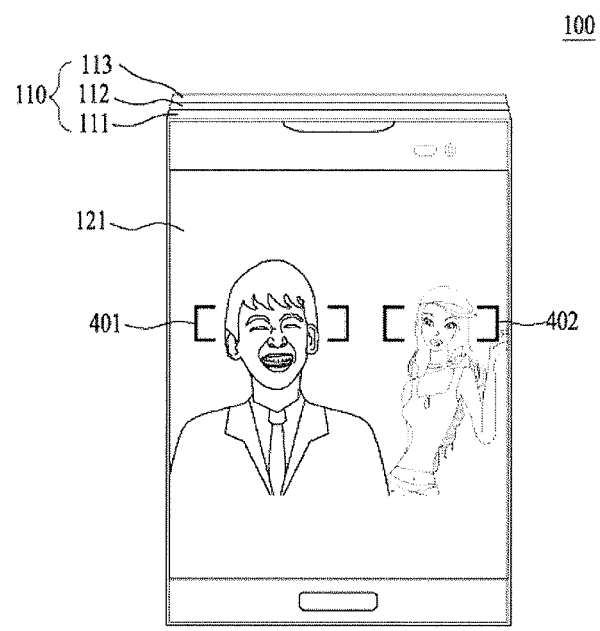
FIG. 4 illustrates a first content displayed in a first display region in a completely folded state of a foldable display device according to the present specification.

Referring to FIG. 3f, a document shown in FIG. 3f (a) corresponds to a document written by Korean and a document shown in FIG. 3f (b) corresponds to a document written by English. The two documents include the same contents. Hence, documents written by a different language for the same content may become the first content and the second content.

According to the seventh embodiment of the present specification, the first content and the second content may respectively correspond to an original version and a revised version for the same document.

In the following, a control operation of the controller 130 is described according to time flow.

FIG. 4 illustrates a first content displayed in a first display region 121 in a completely folded state of a foldable display device 100 according to the present specification.

Referring to FIG. 4, the housing unit 110 is completely folded and the image shown in FIG. 3a (a) is displayed in the first display region 121 as a first content. In the following, as shown in FIG. 4, a state of displaying the first content in the first display region 121 in the completely folded state of the housing unit 110 is referred to as 'first state' in the present specification.

According to one embodiment of the present specification, the controller 130 can further display information indicating the existence of the second content interconnected with the first content in the first display region 121. The first content shown in FIG. 4 is interconnected with the second content having a different focus on the same target. In order to inform a user of the information, indicators 401/402 are respectively displayed in the first display region 121 according to a position of a focus. Meanwhile, FIG. 4 is just an example only. It is able to inform a user of the information in various methods.

When the foldable display device 100 according to the present specification is in the first state, a user may intend to watch the second content. In this case, the user may operate the foldable display device 100 to make the housing unit 110 to be the intermediate unfolded state. In particular, the user switches the housing unit 110 to the intermediate folded state from the completely folded state. In this case, the controller 130 can display second content interconnected with the first content in a second display region 123 facing a direction identical to a direction at which the first display region 121 is facing.

Figure 5:
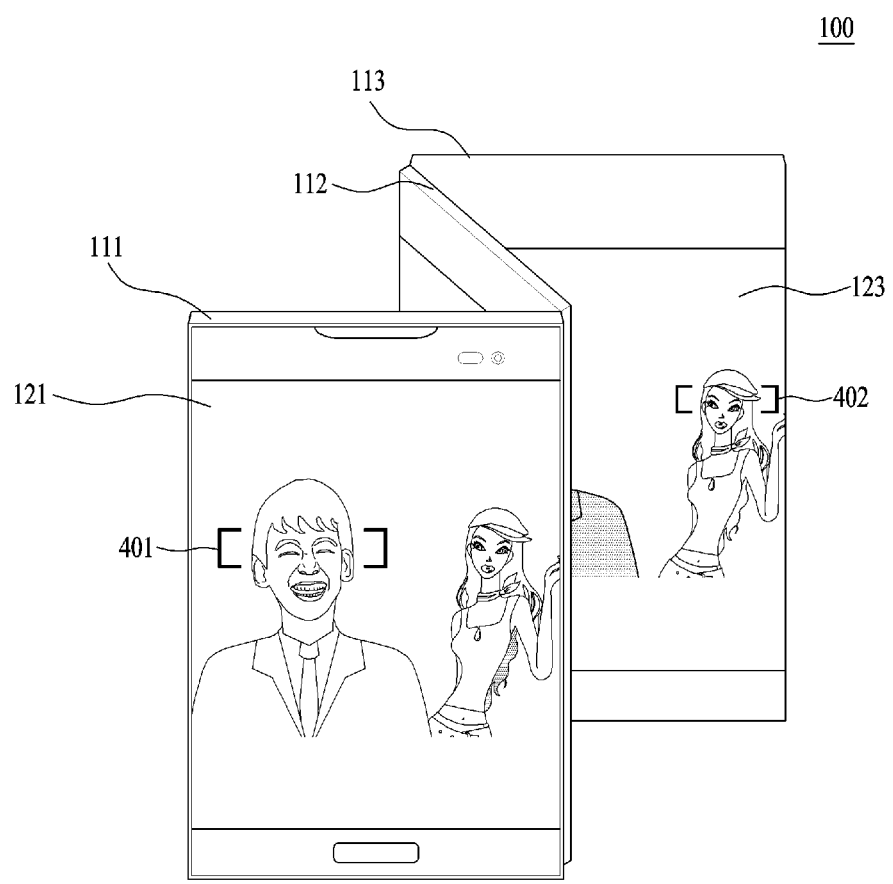
FIG. 5 illustrates a second content displayed in a second display region in an intermediate folded state of a foldable display device according to the present specification.

FIG. 5 illustrates a second content displayed in a second display region 123 in an intermediate folded state of a foldable display device 100 according to the present specification.

Referring to FIG. 5, the housing unit 110 is in the intermediate folded state and the image shown in FIG. 3a (b) is displayed in the second display region 123 as second content. In the following, as shown in FIG. 5, a state of further displaying the second content in the second display region 123 in the intermediate folded state of the housing unit 110 is referred to as 'second state' in the present specification.

In the second state, a user can check the first content displayed in the first display region 121 and the second content displayed in the second display region 123 at a time. Hence, a user of the foldable display device 100 can conveniently compare two contents interconnected with each other at the same time.

Meanwhile, according to one embodiment of the present specification, as shown in the embodiment of FIG. 5, the controller 130 can display content identical to the first content, which is displayed in the first display region 121 in the first state, in the first display region 121 in the second state.

On the contrary, according to a different embodiment, the controller 130 can display content of which the second content is excluded from the first content, which is displayed in the first display region 121 in the first state, in the first display region 121 in the second state.

Figure 6:
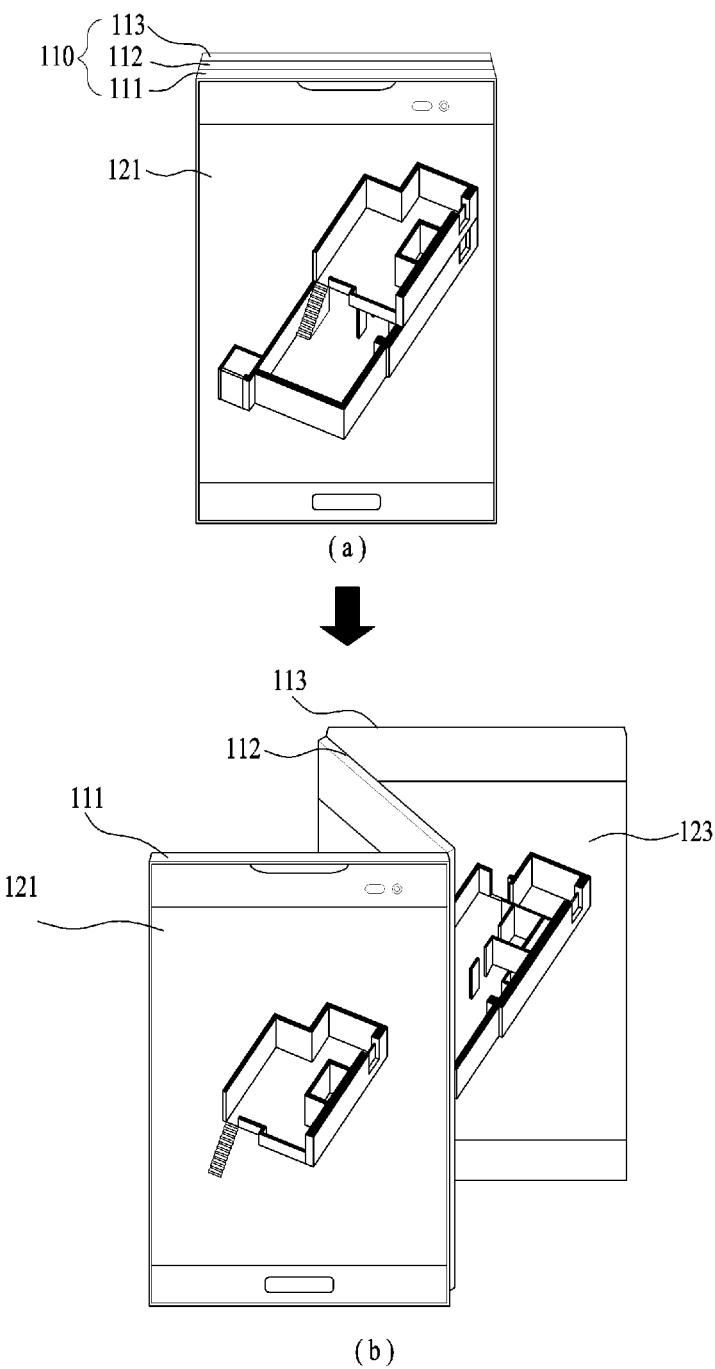
FIG. 6 illustrates an embodiment that first content displayed in a first display region changes when a state is changed to a second state from a first state.

FIG. 6 illustrates an embodiment that first content displayed in a first display region 121 changes when a state is changed to a second state from a first state.

Referring to FIG. 6, FIG. 6 (a) and FIG. 6 (b) correspond to a first state and a second state, respectively. In the first state, first content displayed in the first display region 121 corresponds to a 3D floor plan of a building. In the second state, first content displayed in the first display region 121 corresponds to a 3D floor plan for an upper floor for a building and second content displayed in the second display region 123 corresponds to a 3D floor plan for a lower floor of the building. In particular, the controller 130 displays a 3D floor plan including both an upper floor and a lower floor in the first display region 121 in the first state and displays a 3D floor plan including the upper floor only in the first display region 121 in the second state. In particular, when the first state is changed to the second state, the controller 130 can display content of which the second content is excluded from the first content in the first display region 121.

Referring back to FIG. 3b, as mentioned in the foregoing description, the first and second contents do not mean that there are two contents only. In particular, a plurality of second contents may exist in one first content. If a plurality of second contents exist, it is necessary for the controller 130 to display one of a plurality of the second contents in the second display region 123. In this case, the controller 130 can display one of a plurality of the second contents in the second display region 123 according to the extent of the second state approaching to the completely unfolded state (or the extent of the second state approaching to the completely folded state). Regarding this, it shall be explained in more detail with reference to FIG. 7 in the following.

Figure 7:
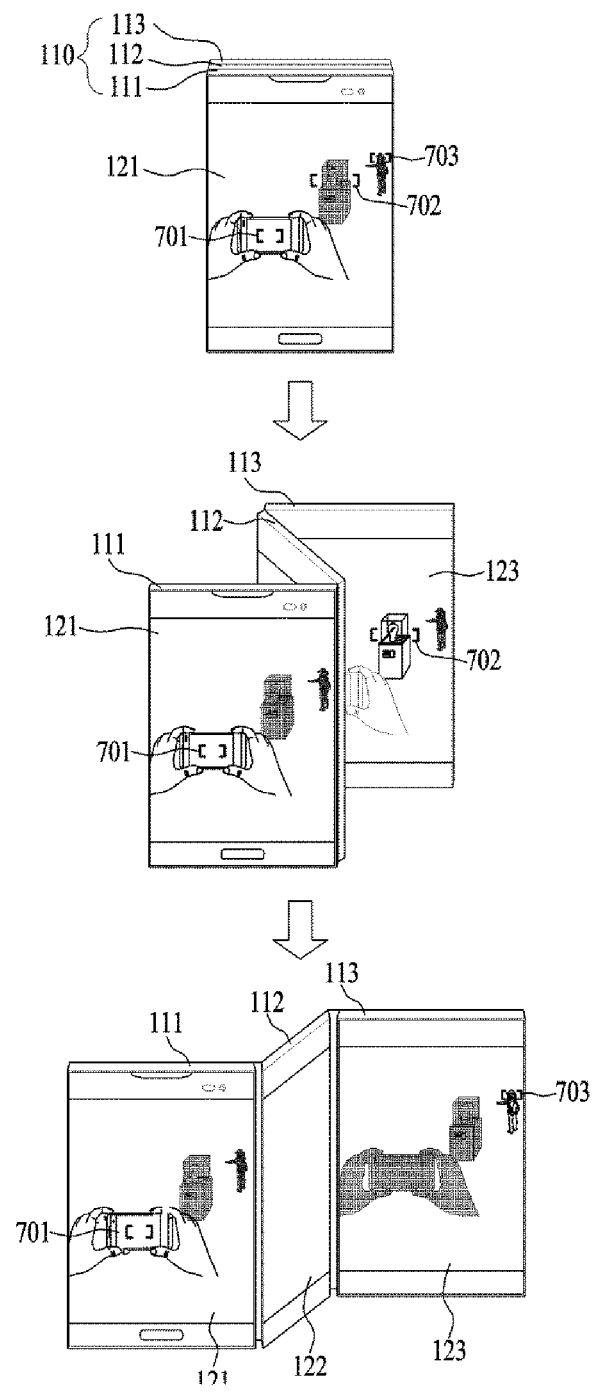
FIG. 7 illustrates a change of second content displayed in a second display region according to the extent of a second state approaching to a completely unfolded state.

FIG. 7 illustrates a change of second content displayed in a second display region 123 according to the extent of a second state approaching to a completely unfolded state.

Referring to FIG. 7, FIG. 7 (a) corresponds to the first state and FIGS. 7 (b) and (c) correspond to the second state.

In this case, although both FIG. 7 (b) and FIG. 7 (c) correspond to the second state, it is able to see that FIG. 7 (c) is closer to the completely unfolded state of the display unit 120. As shown in FIG. 3b, first content and second content shown in FIG. 7 correspond to images having a different focus on the same target.

Meanwhile, a plurality of the second contents can include a value (hereinafter, a difference value) indicating a difference of the extent interconnected with the first content. Referring to FIG. 7 (a), 3 focus information 701/702/703 are displayed in the first display region 121. In this case, first content corresponds to an image having a focus of a reference number 701. Second contents correspond to images having focuses of reference numbers 702 and 703. It is able to see that a focal distance of the reference number 702 and a focal distance of the reference number 703 are gradually away on the basis of the reference number 701. A difference value of each of the second contents increases in relation to the focal distance. In other word, the difference value of the second content increases as the second content is getting away from the focus 701 of the first content.

As the second state is getting close to the completely unfolded state, the controller 130 can display second content of which the difference value is big among a plurality of the second contents in the second display region 123. Referring to FIGS. 7 (b) and (c), an image having a focus of a reference umber 702 is displayed in the second display region 123 in FIG. 7 (b) and an image having a focus of a reference umber 703 is displayed in the second display region 123 in FIG. 7 (c). As the second state of the housing unit 110 is getting close to the completely unfolded state, the controller 130 displays second content of which the difference value is big in the second display region 123 in response to an actually increasing physical distance between the first display region 121 and the second display region 123. The above-mentioned embodiment corresponds to a method of enabling a user to intuitively recognize and operate contents by displaying second content having a difference value from first content in the second display region 123 when a distance between the first display region 121 and the second display region 123 changes.

Figure 8:
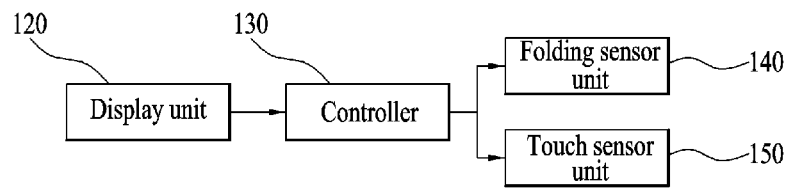
FIG. 8 is a block diagram for a simple electrical connection of a partial configuration included in a foldable display device according to a different embodiment of the present specification.

FIG. 8 is a block diagram for a simple electrical connection of a partial configuration included in a foldable display device 100 according to a different embodiment of the present specification.

Referring to FIG. 8, the foldable display device 100 according to the present specification can further include a touch sensor unit 150 configured to sense a touch of a user touched on the display unit 120 and output an input signal. The display unit 120 may become a touch screen by the touch sensor unit 150. In this case, the controller 130 receives the input signal, analyzes an input of a user, and can control a screen displayed in the display unit 120 according to the analyzed input.

According to one embodiment of the present specification, if a user input inputted to the first display region 121 in the second state corresponds to an input for magnifying a screen, the controller 130 can control a screen of the first content displayed in the first display region to be magnified only.

According to a different embodiment of the present specification, if a user input inputted to the first display region 121 in the second state corresponds to an input for magnifying a screen, the controller 130 can control a screen of the first content displayed in the first display region 121 and a screen of the second content displayed in the second display region 123 to be magnified with the same ratio.

According to one embodiment of the present specification, if a user input inputted to the first display region 121 in the second state corresponds to an input for moving a screen, the controller 130 can control a screen of the first content displayed in the first display region 121 to be moved only.

According to a different embodiment of the present specification, if a user input inputted to the first display region 121 in the second state corresponds to an input for moving a screen, the controller 130 can control a screen of the first content displayed in the first display region 121 and a screen of the second content displayed in the second display region 123 to be moved with the same distance in the same direction.

Meanwhile, when the display unit 120 is switched to the completely unfolded state from the second state, the controller 130 can display the first content in the display unit 120. If the display unit 120 is completely unfolded, it can be determined as a user intends to watch a big screen via the display unit 120. Hence, if the display unit 120 is completely unfolded from the second state, the first content is displayed in the display unit 120.

In the following, a method of controlling a foldable display device according to the present specification is described. Since explanation on each configuration of the foldable display device 100 has already been explained, duplicated explanation is omitted at this time.

Figure 9:
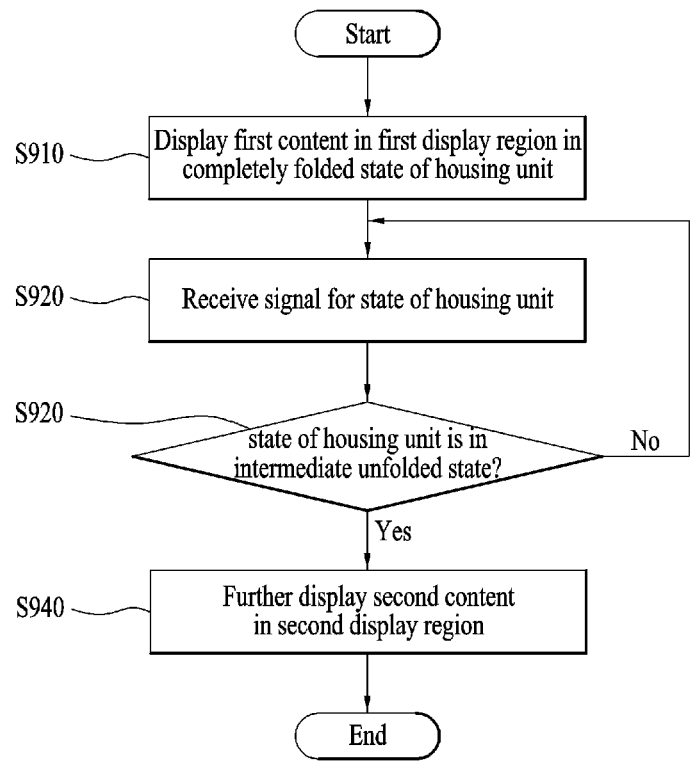
FIG. 9 is a flowchart for a method of controlling a foldable display device according to the present specification.

FIG. 9 is a flowchart for a method of controlling a foldable display device according to the present specification.

Referring to FIG. 9, in the step S910, the controller 130 displays first content in a first display region 121 located at the top in a state that the housing unit 110 is completely folded. After the process of the step S910 is completed, it may proceed to the step S920.

Subsequently, the controller 130 receives a state signal from a folding sensor unit 140 configured to output the state signal indicating a complete folding, an intermediate unfolding (or intermediate folding), or a complete unfolding and detects a state of the housing unit 110. After the process of the step S920 is completed, it may proceed to the step S930.

Subsequently, in the step S930, the controller 130 determines whether or not the state of the housing unit 110 is the intermediate unfolding state. If the state of the housing unit 110 is not the intermediate unfolding state ('No' in the step of S930), the controller 130 proceeds to the step S920. Hence, the controller 130 repeatedly executes the step S920 and the step S930. On the contrary, if the state of the housing unit 110 corresponds to the intermediate unfolding state ('Yes' in the step of S930), the controller 130 proceeds to the step S940.

In the step S940, the controller 130 further displays second content interconnected with the first content in a second display region 123 facing a direction identical to a direction at which the first display region 121 is facing. Subsequently, the controller 130 ends the process.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Meanwhile, contents described in the present specification and/or drawings correspond to preferred embodiments according to the present invention, by which the present invention may be non-limited. The scope of right of the present invention should be determined based on the claims.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

In the present application, such a terminology as 'comprise', 'include' and the like should be construed not as excluding existence of one or more characteristics, a number, a step, an operation, a component, a part or a combination thereof or a possibility of addition in advance but as designating existence of a characteristic, a number, a step, a component, a part or a combination thereof written on the disclosure. In general, a suffix such as "module" and the like may be used to refer to a unit of processing at least one function or operation. A module can be implemented by hardware, software, or a combination thereof.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

In explaining embodiments of the present specification, for clarity, the embodiments are explained centering on an example of adding a single subordinate configuration. However, it may also be able to perform an embodiment that two or more subordinate configurations are added in a manner of being combined. In particular, the scope of the present specification is not restricted by the embodiment disclosed in the present specification.

MODE FOR INVENTION

Various embodiments have been explained in an optimized form to implement the present specification. It is apparent to those skilled in the art that various modifications and changes can be made in the present specification unless the modifications and the changes deviate the idea and the scope of the present specification. Hence, the present specification may include a modification and a change of the present specification within the scope of the claims attached to the present specification and a scope equivalent to the scope of the claims.

INDUSTRIAL APPLICABILITY

All or a part of the present specification can be applied to electronic devices.

What is claimed is:

1. A foldable display device, comprising:
a housing unit configured to contain at least 3 or more bases;
at least two or more hinge units configured to physically connect the bases in a manner of being positioned between the bases and make the bases have a completely unfolded state that the bases are located at the same plane, a completely folded state that the bases are layered, and an intermediate unfolded or an intermediate folded state corresponding to a connection state between the completely unfolded state and the completely folded state;
a display configured to be positioned on at least one side of the housing unit;
a folding sensor unit configured to output a state signal for the completely folded state, the intermediate unfolded or intermediate folded state, or the completely unfolded state of the housing unit; and
a controller configured to:
detect a state of the housing unit by receiving the state signal from the folding sensor unit and control the display,
when first content is displayed in a first display region among at least two or more display regions which are physically or visually separated by the folding of the housing unit in the completely folded state of the housing unit, hereinafter, first state, if the completely folded state of the housing unit is switched to the intermediate unfolded state of the housing unit, cause the display to display second content interconnected with the first content in a second display region facing a direction identical to a direction at which the first display region is facing in a second state,
cause the display to display one of a plurality of the second contents in the second display region according to the extent of the second state approaching the completely unfolded state or the completely folded state, and
cause the display to display one content of the plurality of second contents having a large difference value among the plurality of the second contents in the second display region as the second state is getting close to the completely unfolded state or the completely folded state,
wherein the second content corresponds to the plurality of second contents, and
wherein the plurality of the second contents comprise the difference value indicating an extent of a difference the plurality of the second content is interconnected with the first content.

2. The foldable display device of claim 1, wherein the controller is configured to cause the display to further display information indicating the existence of the second content interconnected with the first content in the first display region in the first state.

3. The foldable display device of claim 1, wherein the controller is configured to cause the display to display content identical to the first content, which is displayed in the first display region in the first state, in the first display region in the second state.

4. The foldable display device of claim 1, wherein the controller is configured to cause the display to display content of which the second content is excluded from the first content, which is displayed in the first display region in the first state, in the first display region in the second state.

5. The foldable display device of claim 1, further comprising a touch sensor unit configured to detect a user touch touched on the display and output an input signal, wherein the controller is configured to receive the input signal, analyze a user input, and control a screen displayed on the display according to the analyzed input.

6. The foldable display device of claim 5, wherein if a user input inputted on the first display region in the second state corresponds to an input for magnifying a screen, the controller is configured to control a screen of the first content displayed in the first display region to be magnified only.

7. The foldable display device of claim 5, wherein if a user input inputted on the first display region in the second state corresponds to an input for magnifying a screen, the controller is configured to control screens of the first content and the second content displayed in the first display region and the second display region to be magnified with the same ratio.

8. The foldable display device of claim 5, wherein if a user input inputted on the first display region in the second state corresponds to an input for moving a screen, the controller is configured to control a screen of the first content displayed in the first display region to be moved only.

9. The foldable display device of claim 5, wherein if a user input inputted on the first display region in the second state corresponds to an input for moving a screen, the controller is configured to control screens of the first content and the second content displayed in the first display region and the second display region to be moved with the same distance in the same direction.

10. The foldable display device of claim 1, wherein the first content and the second content correspond to images having a different focus on the same target.

11. The foldable display device of claim 1, wherein the first content and the second content correspond to images having different time information on the same target.

12. The foldable display device of claim 1, wherein the first content and the second content correspond to floor plans having a different height for the same building.

13. The foldable display device of claim 1, wherein the first content and the second content correspond to maps having a different height for the same region.

14. The foldable display device of claim 1, wherein the first content and the second content correspond to maps represented by a different scheme for the same region.

15. The foldable display device of claim 1, wherein the first content and the second content correspond to documents written by a different language for the same content.

16. The foldable display device of claim 1, wherein the first content and the second content respectively correspond to an original version and a revised version for the same document.

17. The foldable display device of claim 1, wherein if the display is switched to the completely unfolded state from the second state, the controller is configured to display the first content on the display.

18. A method of controlling a foldable display device, which contains a housing unit configured to contain at least 3 or more bases, at least two or more hinge units configured to physically connect the bases in a manner of being positioned between the bases and make the bases have a completely unfolded state that the bases are located at the same plane, a completely folded state that the bases are layered, and an intermediate unfolded or an intermediate folded state corresponding to a connection state between the completely unfolded state and the completely folded state, and a display unit-configured to be positioned at least one side of the housing unit, comprising the steps of:

causing the display to display first content in a first display region among at least two or more display regions which are physically or visually separated by the folding of the display in the completely folded state of the housing unit;

detecting a state of the housing unit by receiving a state signal from a folding sensor unit configured to output a signal for the completely folded state, the intermediate unfolded or intermediate folded state, or the completely unfolded state of the housing unit;

if the state of the housing unit is switched to the intermediate unfolded state, further displaying second content interconnected with the first content in a second display region facing a direction identical to a direction at which the first display region is facing in a second state;

causing the display to display one of a plurality of the second contents in the second display region according to the extent the second state approaches the completely unfolded state or the completely folded state; and causing the display to display one content of the plurality of second contents having a large difference value among the plurality of the second contents in the second display region as the second state is getting close to the completely unfolded state;

wherein the second content corresponds to the plurality of second contents, and wherein the plurality of the second contents comprise the difference value indicating the extent of a difference the plurality of the second content is interconnected with the first content.

* * * * *